United States Patent
Salles et al.

[11] 3,802,920
[45] Apr. 9, 1974

[54] SUPPORT FOR A BATTERY OF PHOTOELECTRIC SOLAR CELLS

[75] Inventors: Yvon Salles, Epron; Gerard Robert David, Cambes en Plaine, both of France

[73] Assignee: U.S. Philips Corporation, New York, N.Y.

[22] Filed: Feb. 29, 1972

[21] Appl. No.: 230,386

[30] Foreign Application Priority Data
Mar. 3, 1971  France .............................. 71.07319

[52] U.S. Cl. .............................................. 136/89
[51] Int. Cl. ......................................... H01l 15/02
[58] Field of Search ...................... 136/89; 244/1 SS

[56] References Cited
UNITED STATES PATENTS

| | | |
|---|---|---|
| 2,989,575 | 6/1961 | Wallace .............................. 136/89 |
| 3,109,226 | 11/1963 | Harmon et al. ....................... 136/89 |
| 3,202,998 | 8/1965 | Hoffman ............................ 244/1 SS |
| 3,433,676 | 3/1969 | Stein ................................... 136/89 |
| 3,459,391 | 8/1969 | Haynos ............................. 244/1 SS |
| 3,672,999 | 6/1972 | Barbera .............................. 136/89 |

*Primary Examiner*—Donald L. Walton
*Attorney, Agent, or Firm*—Frank R. Trifari

[57] ABSTRACT

A support for a battery of photoelectric solar cells comprising two separate parts which form one assembly, a first part supporting the photoelectric cells, the second part supporting means for the mechanical connection of the assembly. The first part is a solid body mould about the second part. The second part has spaced sleeves with terminating collars and are connected by axial bars.

11 Claims, 2 Drawing Figures

SUPPORT FOR A BATTERY OF PHOTOELECTRIC SOLAR CELLS

The present invention relates to a support for a battery of photoelectric solar cells. The support is formed by a solid body having the photoelectric cells disposed and interconnected on the surface thereof, and structures permitting mechanical connection of the said support to exterior devices.

It is known that photoelectric solar cells grouped in batteries are used, among other applications in devices intended for studies in high altitude, for example in the atmosphere or the stratosphere, where they are conveyed by balloons. These devices comprise an electronic observation apparatus and a supply centre for said apparatus provided with a battery of accumulators and a battery of photoelectric solar cells, the latter being intended to supply the current necessary for recharging the accumulators.

It is desirable that the battery of photoelectric cells be separated from the rest of the device so that it can benefit from a maximum of light and thus operate efficiently. The said battery may also be placed either above, or below or even among the other components of the device. Therefore its support should have a high mechanical tensile strength.

On the other hand, the same support should also be as light as possible with the double purpose of minimizing the load carried by the balloon and to observe the standards of aerial security.

Various models of supports for a battery of photoelectric cells of the type in question have already been proposed but they do not simultaneously possess these important qualities of rigidity and light weight. Lightweight supports are known but they are very fragile.

One of the objects of the present invention is to provide a support for a battery of photoelectric solar cells having a small mass and being capable of withstanding considerable longitudinal forces without fracture or deformations.

According to the invention, the support for a battery of photoelectric solar cells has a solid body with said photoelectric cells disposed and interconnected on its surface and structures intended to permit the mechanical connection of the support to exterior devices. The support is formed from two parts forming one assembly, one supporting the said photoelectric cells, the other supporting the said structures. The advantages which are related to the separation of the two distinct functions of the said support, that of mechanical support of the photoelectric cells on the one hand and that of the mechanical connection to the exterior members on the other hand, are appreciable. First of all, the structure according to the invention permits the realization of a particularly light-weight support. In fact, the photoelectric cells themselves are very light (a few grams each) and in order to ensure their only support without any mechanical stress, a material such as, for example, expanded polystyrene the density of which is only 0.02 to 0.06 is very suitable.

On the other hand, the part of the support which is subjected to mechanical stresses may be rigorously adapted to the extent of the supporting force required. Its mass, related to its geometry, may thus be adjusted to a minimum value which is compatible with said force, which also contributes to making the support light.

On the other hand, the structure in two parts according to the invention better facilitates the realization of the supports adapted to various particular cases which will no doubt present themselves in the field considered of scientific exploration in altitude.

According to a preferred embodiment of a support for photoelectric solar cells according to the invention, the part of the support on which the photoelectric cells are fixed is moulded around an axially disposed piece intended to be subjected to the tensile stresses.

Advantageously, the said axially disposed piece is a sleeve in the form of a cylinder and the wall of said sleeve is apertured which presents the double advantage of permitting a reduction of the weight of the piece while preserving a sufficient thickness and of supplying windows the edges of which favour the connection of the moulded material disposed around the said piece. On the other hand, the presence of an axial passage in said piece facilitates the disposition of the connections to exterior devices of the support while supplying a passage for said connections.

Also in an advantageous manner, the central piece itself is moulded and manufactured from a plastic material such as, for example, polyphenylene oxide which combines an assembly of physical properties which makes it particularly interesting for the use considered — resistance to the high stress, excellent dimensional stability under load, high deformation temperature (no deformation at all up to 175°C), high resistance to shocks, low density ($d \approx 1$) taken into account the mechanical qualities and the part supporting the photoelectric cells is moulded on said central piece.

As has already been mentioned, the expanded polystyrene is readily suitable for the realization of the said part of the support on which the photoelectric cells are fixed, first of all due to its light weight, but also due to its resistance to fatigue and the vibrations and due to its thermally and electrically insulating power. In addition, it softens at a temperature of 75° to 80° C so that it can be moulded on the polyphenylene oxide which itself does not start deforming until at approximately 175° C; the mechanical connection between the two materials which is effected by moulding has proved to be very satisfactory.

From the following description with reference to the accompanying drawing, given by way of non-limiting example, it will be well understood how the invention can be realized.

Figure 1:
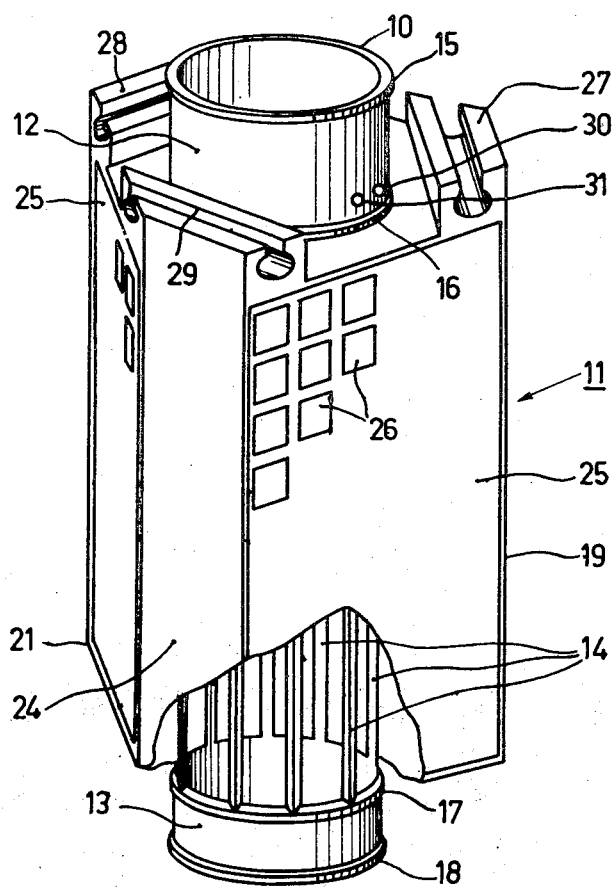
FIG. 1 shows in a perspective view an example of a support for photoelectric solar cells according to the characteristics of the invention.
Figure 2:
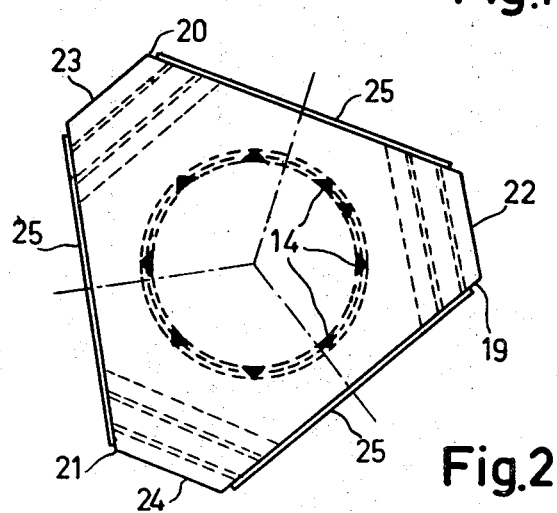
FIG. 2 is a sectional view of the support of FIG. 1, the plane of the section being situated approximately halfway the height of the said support.

The support for photoelectric solar cells of FIGS. 1 and 2 is constituted essentially by two pieces: one axial piece 10 which generally is cylindrical and a piece 11 which is prismatic and which partially surrounds the piece 10.

The axial piece 10 itself comprises three separate parts: at its extremities two cylindrical sleeves 12 and 13, the height of which may be equal or different, according to the needs, and which are connected together in the body of the support by a number of bars 14.

The sleeve 12 comprises two circumferential collars 15 and 16 and the sleeve 13 is provided with collars 17 and 18.

The form of the collars is of no particular significance. They are provided to limit, on the outer surface of the sleeves, areas on which it is possible to produce the mechanical connection with exterior devices, for example by clamping by means of rings.

The number of connecting bars is fixed as a function of the importance of the longitudinal force which is exerted on the support and to which the axial piece 10 is subjected. In the Figures the bars 14 have a triangular section but this form is by no means imperative.

Advantageously, the piece 10 is formed by moulding of a plastic material, such as polyphenylene oxide as has been previously indicated.

The piece 11 which envelops the piece 10, except the sleeves 12 and 13, is a prismatic block of a hexagonal section comprising three large-area lateral faces 19, 20 and 21 and three faces 22, 23 and 24 of a smaller area.

On the faces 19, 20 and 21 are disposed (for example by gluing) panels 25 which are provided with photoelectric solar cells in such manner as to constitute a battery of photoelectric cells. A few of said photoelectric cells are shown diagrammatically in the Figure at 26.

The faces 22, 23 and 24 of the block 11 have not received any photoelectric cells. They correspond simply to parts of the block which have been eliminated so as to adjust the surfaces of the faces 19, 20 and 21 as close as possible to those of the panels 25 which they support and thus to make the support lighter.

The connection wires between the photoelectric cells 26 and interconnection wires between the panels 25 are not shown in the Figures. However, structures such as those shown at 27, 28 and 29 at the top of the block 11 which limit the passages, are intended to facilitate the continuation and holding of the wires or of the connection elements. Holes such as, for example, the holes 30 and 31 pressed in the sleeve 12 are also provided to permit the possible electric connections, inside the axial piece, with exterior devices to the battery of photoelectric cells.

According to a particularly interesting technique of realizing the support shown, the block 11 is moulded on the axial piece 10, the moulding material being advantageously expanded polystyrene. The connection surfaces defined by the bars 14 ensure a sufficiently large mechanical rigidity of the assembly of the block.

On the other hand, the polyphenylene oxide is deformed very little under load, the solidity of the mechanical connection between the pieces 10 and 11 is not made thinner when the piece 10 is submitted to a longitudinal force.

It is evident that the section of the block 11 which has been chosen to be hexagonal in the embodiment shown in FIGS. 1 and 2 could be quite different, regular or irregular. It is even not inevitable that the axial hollow piece 10 has a circular section.

On the other hand and according to a different mode of realization of the axial piece 10, the bars 14 ensuring the connection between the sleeves 12 and 13 could, for example, be replaced by a continuous wall in which apertures of a suitable number and dimensions have been provided.

What is claimed is:

1. A solar cell battery arrangement comprising a support assembly having a first part formed by a body having a surface and a longitudinally extending opening, said solar cells carried on the surface of said body, and a second part substantially accommodated in said opening, said first and second parts combined to form said support assembly, and connection means carried on said second part for mechanically connecting said assembly to exterior devices.

2. The solar cell battery arrangement according to claim 1 wherein said body forming the first part of said support assembly is made of foamed material.

3. The solar cell battery arrangement according to claim 2 wherein said second part of said support assembly comprises two spaced sleeves terminating in collars forming said connection means, and a plurality of bars axially arranged connecting said sleeves together.

4. The solar cell battery arrangement according to claim 2 wherein said first part of said support assembly formed by said body is in the form of a prismatic block.

5. The solar cell battery arrangement according to claim 2 wherein said first part of said support assembly is coaxially arranged with respect to said second part.

6. The solar cell battery arrangement according to claim 3 wherein said bars are accommodated within said opening of said first part, and said sleeves are external thereto.

7. The solar cell battery arrangement according to claim 6, wherein said second part of said support assembly is moulded from plastic material.

8. The solar cell battery arrangement according to claim 3 wherein said first part of said support assembly is moulded on the axially arranged bars.

9. The solar cell battery arrangement according to claim 7 wherein said plastic material is polyphenylene oxide.

10. The solar cell battery arrangement according to claim 9 wherein said moulding material is expanded polystyrene.

11. A support assembly for a battery of photoelectric solar cells comprising a first part formed by a body of foamed material having a surface for carrying thereon said solar cells, said body having a longitudinally extending opening, and a second part substantially accommodated in said opening comprising two spaced sleeves terminating in collars forming connection means for mechanically connecting said assembly to exterior devices, and a plurality of bars axially arranged connecting said sleeves together, said first and second parts combined to form said support assembly.

* * * * *